United States Patent [19]

Iijima et al.

[11] 4,258,399

[45] Mar. 24, 1981

[54] MAGNETIC RECORDING AND REPRODUCING APPARATUS

[75] Inventors: Kazunori Iijima; Kazuo Honma, both of Ibaraki; Takao Terayama, Kashiwa; Masashi Yoshida, Nakaminato; Hideyuki Kawase, Katsuta; Seii Miyakawa, Yokohama, all of Japan

[73] Assignee: Hitachi, Ltd., Japan

[21] Appl. No.: 7,974

[22] Filed: Jan. 31, 1979

[30] Foreign Application Priority Data

Feb. 15, 1978 [JP] Japan ................................. 53-15418
Jun. 14, 1978 [JP] Japan ................................. 53-70909

[51] Int. Cl.$^3$ ........................ G11B 15/66; G11B 17/00
[52] U.S. Cl. .......................................... 360/85; 360/95
[58] Field of Search ................ 360/85, 84, 95, 132; 242/55.19 A

[56] References Cited

U.S. PATENT DOCUMENTS

| | | | |
|---|---|---|---|
| 3,702,383 | 11/1972 | Inaga et al. | 360/85 |
| 3,781,487 | 12/1973 | Swain | 360/85 |
| 4,045,820 | 8/1977 | Staar | 360/85 |
| 4,092,684 | 5/1978 | Umeda | 242/198 X |
| 4,115,825 | 9/1978 | Hayashi et al. | 360/85 |
| 4,126,888 | 11/1978 | Mayashi et al. | 360/85 |

*Primary Examiner*—John H. Wolff
*Attorney, Agent, or Firm*—Craig & Antonelli

[57] ABSTRACT

A magnetic recording and reproducing apparatus, in which a magnetic tape is automatically mounted on a tape guiding drum containing rotary magnetic heads for the recording and reproduction of signals on and from the tape, is provided with a pair of tape drawing and mounting members which are engageable with a tape in a cassette mounted on the apparatus and movable along guide slots in guide board to draw the tape out of the cassette to a position in which the tape is mounted on and extends around the tape guiding drum. The tape drawing and mounting members are operatively connected to chains. Drive mechanism is provided to wind and unwind the chains so that the chains are moved along guide members to thereby move the tape drawing and mounting members, respectively, away from the cassette for the required tape drawing and mounting operation.

13 Claims, 16 Drawing Figures

MAGNETIC RECORDING AND REPRODUCING APPARATUS

BACKGROUND OF THE INVENTION

1. Field of the Invention

The present invention relates to a magnetic recording and reproducing apparatus in which a magnetic tape is automatically mounted on a tape guiding drum containing therein rotary magnetic heads so that signals can be recorded on or reproduced from the tape.

2. Description of the Prior Art

As video tape recorders for domestic purpose have been developed, there have been proposed various magnetic recording and reproducing apparatuses of the type in which magnetic tapes are helically mounted on tape guiding drums containing rotary magnetic heads so that signals can be recorded on or reproduced from the tapes. With this type of magnetic recording and reproducing apparatuses, the magnetic tape must be mounted on the tape guiding drum such that the tape extends around more than one half the peripheral surface of the drum. The tape mounting operation was very troublesome and needed a high degree of accuracy. Accordingly, mechanisms have been proposed to automatically mount magnetic tapes on tape guiding drums of magnetic recording and reproducing apparatuses.

The proposed automatic tape mounting mechanisms are classified into two types, one of which is disclosed in, for example, U.S. Pat. No. 4,045,820 issued Aug. 30, 1977 to Staar, and is so constructed that tape drawing members or tape guiding fingers are operated solely by link mechanisms. Because of this construction, the automatic tape mounting mechanism has difficulties in that the mechanical accuracy of the link mechanisms greatly influences the tape mounting operation with a resultant failure to precisely mount tapes on the tape guiding drum and that a large number of structural elements or components are required. The other or second type of automatic tape mounting mechanism is disclosed in, for example, japanese Pre-Examination Patent Publication No. 134,410/77 and No. 134,411/77 corresponding to U.S. Pat. Nos. 4,126,888 and 4,115,825 respectively issued Nov. 21, 1978 and Sept. 19, 1978 to Hayashi et al, and is so constructed that tape drawing members are operated by the rotation of rotary discs or rings disposed beneath the tape guiding drum. The rotary discs or rings are of diameters larger than that of the tape guiding drum and not only make the entire apparatus large-sized but also produce dead spaces therein. In addition, the mechanism for rotating the rotary discs or rings is of complicated structure and requires a large number of components.

SUMMARY OF THE INVENTION

It is therefore an object of the present invention to provide a magnetic recording and reproducing apparatus in which a tape mounting mechanism is of a simplified structure but provides a reliable tape mounting operation.

According to the present invention, there is provided an apparatus for recording and reproducing signals on and from a magnetic tape contained in a tape cassette mounted in a cassette receiving section of the apparatus, the apparatus comprising; a base plate a guide board disposed above the base plate; a rotary magnetic head assembly mounted on the base plate and including rotary magnetic heads for recording and reproducing signals on and from a magnetic tape mounted on the assembly; the cassette receiving section being located forwardly of the rotary magnetic head assembly; the guide board defining therein guide slots extending generally rearwardly from the cassette receiving section; a pair of tape drawing and mounting means operative to engage with a magnetic tape in a cassette mounted in the cassette receiving section, the tape drawing and mounting means being movable respectively along the guide slots to draw the tape out of the cassette to a position in which the tape is mounted on and extends around the rotary magnetic head assembly; means for stopping the movements of the tape drawing and mounting means at positions located substantially on the opposite sides of the rotary magnetic head assembly; chains disposed between the guide board and the base plate and operatively connected to respective tape drawing and mounting means; means for winding and unwinding the chains; and guide members on the base plate for guiding the movements of the chains, respectively.

The above and other objects, features and advantages of the present invention will be made more apparent by the following description with reference to the accompanying drawings.

DESCRIPTION OF A PREFERRED EMBODIMENT

Figure 1:
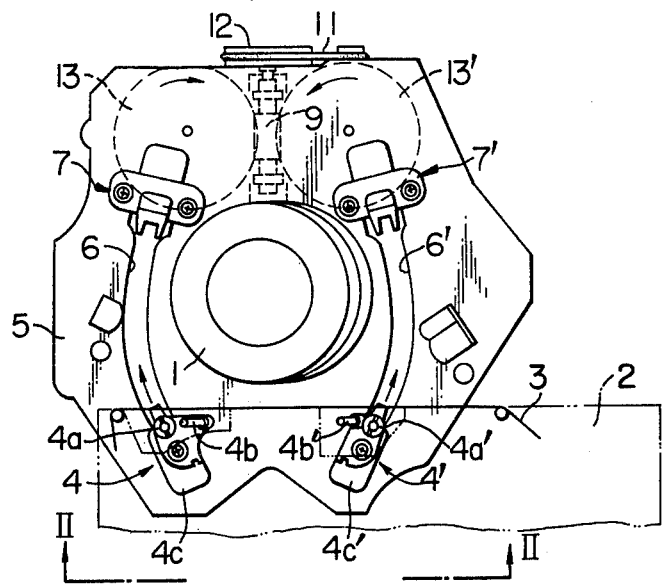
FIG. 1 is a fragmentary top plan view of an embodiment of a magnetic recording and reproducing apparatus according to the present invention with parts being shown in their cassette loading positions.
Figure 2:
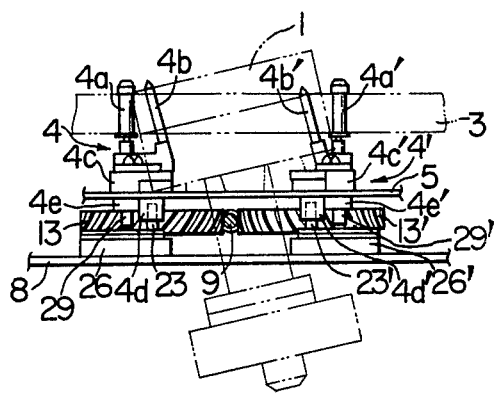
FIG. 2 is a view taken along line II—II in FIG. 1.
Figure 3:
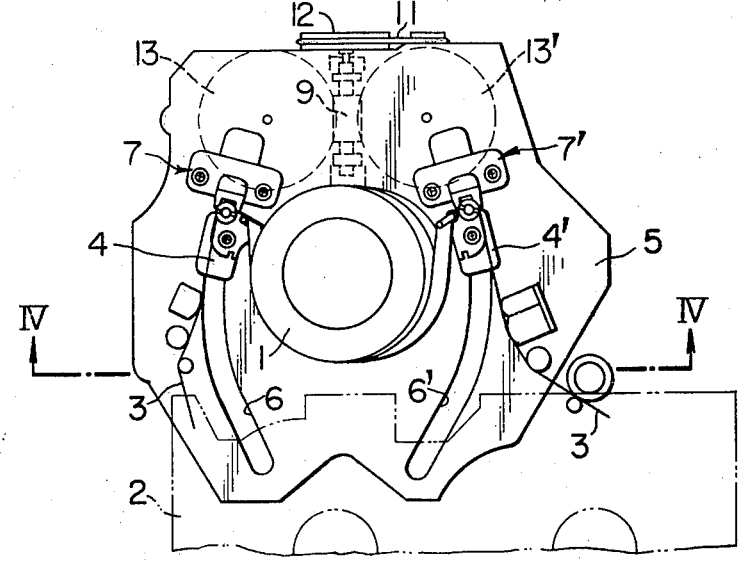
FIG. 3 is a view somewhat similar to FIG. 1 but illustrates machine parts in positions in which a magnetic tape is mounted on a tape guiding drum.
Figure 4:
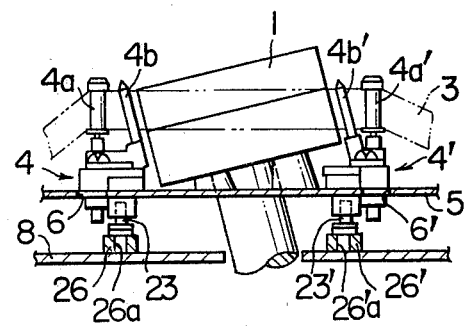
FIG. 4 is a view taken along line IV—IV in FIG. 3.

Referring first to FIGS. 1 to 4 of the drawings, an embodiment of a magnetic recording and reproducing apparatus of the invention includes a tape running section in which is provided a tape guiding drum 1 carrying a pair of rotary magnetic heads (not shown) mounted on the drum 1 in diametrically opposite relationship to each other. The rotary magnetic heads and the tape guiding drum 1 cooperate together to form a rotary magnetic head assembly. The apparatus is designed to receive thereon a tape cassette shown by broken lines 2 and containing therein tape feeding and take-up reels (both not shown) around which a length of magnetic tape 3 is wound. The apparatus includes a pair of means generally designated by the reference numerals 4 and 4' for drawing the tape 3 out of the cassette 2 and mounting the tape on the tape guiding drum 1, as shown in FIG. 3. The tape drawing and mounting means 4 and 4' respectively comprise tape drawing rolls 4a and 4a', inclined posts 4b, 4b' and carriages 4c and 4c' which carry the rolls and posts, respectively. When the apparatus is loaded with the cassette 2, the tape drawing and mounting means 4 and 4' are positioned within a cutout in the cassette 2, as shown in FIG. 1. When an operator actuates either recording or reproducing push button (not shown) of the apparatus, the tape drawing and mounting means 4 and 4' are driven by drive means, to be discussed later, and moved on a guide board 5 along guide slots 6 and 6' formed therein so that the tape 3 is drawn out of the cassette 2. The movements of the tape drawing and mounting means 4 and 4' are continued until they are brought into engagement with stops generally designated by the reference numerals 7 and 7', respectively, as shown in FIG. 3, whereby the tape 3 is mounted on the tape guiding drum 1 in the manner shown in FIGS. 3 and 4.

Referring to FIG. 2, the connection between the guide board 5 and the carriages 4c and 4c' of the tape drawing and mounting means 4 and 4' will be described briefly. The carriages 4c and 4c' have first and second downward projections 4d and 4e and 4d' and 4e', respectively, which are slidably received in the guide slots 6 and 6' in the guide board 5, respectively. The guide board 5 is mounted on a base plate 8 with a spacer means (not shown) disposed therebetween. Within the space between the guide board 5 and the base plate 8, there is provided a means for driving the tape drawing and mounting means 4 and 4', as will be described in detail hereinbelow.

Figure 5:
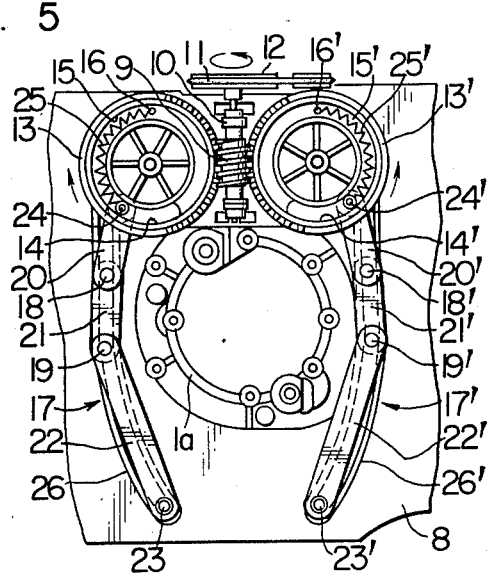
FIG. 5 is a fragmentary view of the apparatus of the invention illustrating in plan view means for driving tape drawing and mounting means of the apparatus.

The driving means will be described mainly with reference to FIG. 5 which shows a chassis 1a for supporting the tape guiding drum 1 which is omitted in this figure for the simplification of illustration. A worm 9 is disposed rearwardly of the tape guiding drum 1 and rotatably mounted by means of bearings 10 on the base plate 8 so that the axis of the worm extends toward the center of the tape guiding drum 1. The worm 9 has a shaft on which a pulley 12 is mounted and drivingly connected by an endless belt 11 to a motor (not shown).

A pair of worm wheels 13 and 13' are provided in meshing engagement with the worm 9 and disposed rearwardly of the tape guiding drum 1 in symmetrical relationship with respect to the axis of the worm 9. The worm wheels 13, 13' are disposed between and supported by the guide board 5 and the base plate 8, as best seen in FIG. 2. The worm wheels are provided with arcuate slots 14 and 14' and spring guide grooves 15 and 15', respectively. Advantageously, the worm wheels 13, 13' are formed from a lightweight material, such as a plastics material. Pins 16 and 16' are mounted respectively on the worm wheels 13, 13' so as to be engaged by spring members 25, 25' to be discussed later.

The worm wheels 13 and 13' are respectively connected to chains generally designated by the reference numerals 17 and 17' which, in the illustrated embodiment of the invention, are respectively constituted by three link members 20, 21, 22; 20', 21', 22' which in turn are pivotally linked together by two pins 18, 19; 18', 19'. The ends of the link members 22 and 22' adjacent to the tape drawing and mounting means 4 and 4' are connected to the projections 4d and 4d' thereof by means of pins 23 and 23', respectively, as will be seen in FIG. 2. On the other hand, the ends of the link members 20 and 20' adjacent to the worm wheels 13 and 13' are respectively connected to the worm wheels 13, 13' by means of pins 24 and 24' which are mounted on the link members 20 and 20' and movably engaged in the arcuate slots 14 and 14' in the wheels 13 and 13', respectively. Spring members 25 and 25' are disposed respectively in the spring guide grooves 15 and 15' in the worm wheels 13 and 13' and have opposite ends engaged or secured to the pins 24 and 16', respectively. These springs 25 and 25' are provided to take up excessive movements or strokes of the tape drawing and mounting means 4 and 4' which would be caused by an overrun of the motor when energized to actuate the tape drawing and mounting means 4, 4'. For this purpose, the springs 25 and 25' are tensioned at the time of initial installation so that the pins 24 and 24' are resiliently urged against one ends of the slots 14 and 14', respectively.

Guide members 26 and 26' are mounted on the upper surface of the base plate 8. These guide members 26 and 26' are generally arcuate and define guide grooves 26a and 26'a, respectively, along which the series of pins 18, 19 and 23 of the chain 17 and the series of the pins 18', 19' and 23' of the chain 17' are moved. These guide members 26 and 26' are so shaped that the guide grooves 26a and 26'a defined therein extend from a position adjacent to the front edge of the apparatus designed to receive a tape cassette, to a position located beneath the worm wheels 13 and 13'. The intermediate sections of the guide grooves 26a and 26'a extend by the opposite sides of the tape guiding drum 1, while the rearward end sections of these guide grooves are located beneath the worm wheels 13 and 13' and formed into substantially circular arcs which are coaxial with the worm wheels 13 and 13', respectively. The guide members 26 and 26' can conveniently and economically be formed on the surface of the base plate 8 by outsert molding of a plastic material.

Figure 6:
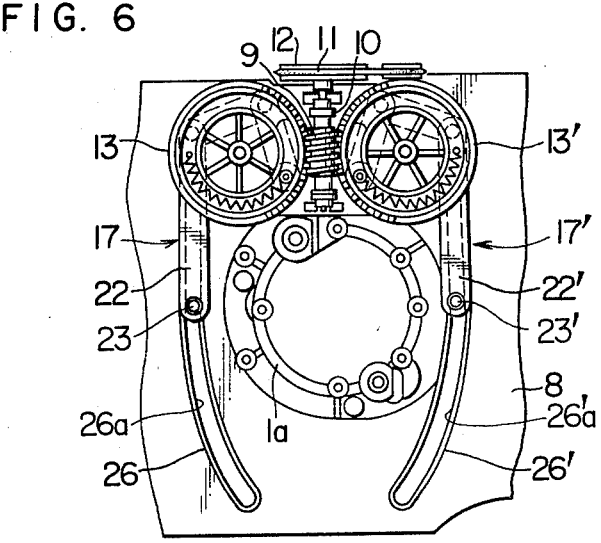
FIG. 6 is similar to FIG. 5 but illustrates the driving means in their positions in which the tape is mounted on the tape guiding drum.

Because the rearward end sections of the guide grooves 26a and 26'a are of substantially circular shapes, the link members 20 and 21 and 20' and 21' of the chains 17 and 17', respectively, can be moved along the circular rearward end sections of the guide grooves 26a and 26'a to the positions shown by broken lines in FIG. 6 when the worm wheels 13 and 13' are driven by the motor to draw the tape 3 out of the cassette 2.

In operation, the apparatus is charged or loaded with a cassette 2 with the tape drawing and mounting means 4 and 4' being in their forward or ready positions shown in FIG. 1. Then either recording or reproducing push-button (not shown) of the apparatus will be actuated by an operator so that the motor (not shown) is energized to rotate the worm 9 via belt 11 and pulley 12 whereby the worm wheels 13 and 13' are rotated in clockwise and counterclockwise directions, respectively, as viewed in FIG. 5. The rotations of the worm wheels 13 and 13' are transmitted through the spring members 25 and 25' and through the pins 24 and 24', respectively, to the two chains 17 and 17' so that these chains are moved rearwardly away from the cassette 2. The movements of the chains 17 and 17' are smoothly guided by the guide members 26 and 26', respectively, because the series of the pins 18, 19 and 23 and 18', 19' and 23' of the two chains 17 and 17' are received for slidable movement in the guide grooves 26a and 26'a defined in the two guide members 26 and 26', respectively. The tape drawing and mounting means 4 and 4' are operatively connected to the two chains 17 and 17', as discussed previously, and therefore are moved by the chains 17, 17' along the guide slots 6 and 6' formed in the guide board 5 to draw the magnetic tape 3 out of the cassette 2. The movements of the chains 17 and 17' are continued until the tape drawing and mounting means 4 and 4' are brought into engagement with the stops 7 and 7', respectively. The engagement may conveniently be detected by means of a microswitch (not shown) which will be operative to deenergize the motor. This point, however, is not directly concerned with the present invention and thus will not be described in more detail.

At the time when the tape drawing and mounting means 4 and 4' are engaged by the stops 7 and 7', respectively, the link members 20 and 21 and 20' and 21' of the two chains 17 and 17' have been moved into the circular rearward sections of the guide grooves 26a and 26'a situated beneath the worm wheels 13 and 13', as will be seen in FIG. 6. In these positions of the chains 17 and 17', the tape drawing and mounting means 4 and 4' are moved to the positions shown in FIG. 3, whereby the tape 3 are automatically mounted on and extends around the periphery of the tape guiding drum 1 over an angle of at least 180 degrees, as will be seen in FIGS. 3 and 4.

Structural details of the tape drawing and mounting means 4 and 4' and the stops 7 and 7' will be described hereinafter with reference to FIGS. 7 through 14. The tape drawing and mounting means will be described first in conjunction with FIGS. 7 through 10.

Figure 7:
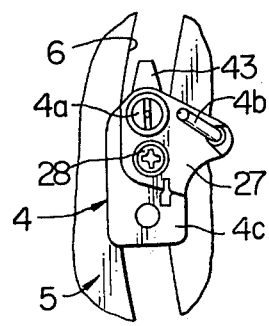
FIG. 7 illustrates in an enlarged top plan view one of the tape drawing and mounting means shown in FIGS. 1 to 4.

FIG. 7 is a top plan view of the tape drawing and mounting means 4 which is movable along the guide slot 6 formed in the guide board 5. The structures of the other tape drawing and mounting means 4' and associated components are symmetrical to those of the tape drawing and mounting means 4 and thus will not be described herein. The tape drawing and mounting means 4 includes the tape drawing roll 4a and the inclined post 4b, as discussed previously. In the illustrated embodiment of the invention, the inclined post 4b is mounted on and extends from a post-mounting plate 27 which is prepared separately or independently of the carriage 4c and secured thereto.

Figure 8:
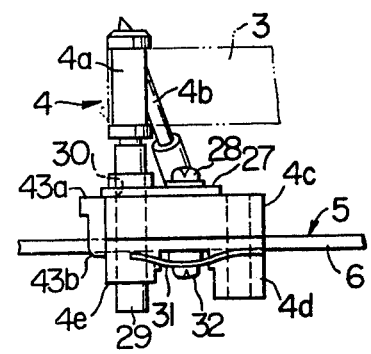
FIG. 8 is a side elevation of the tape drawings means shown in FIG. 7.

FIG. 8 is a side elevation of the tape drawing and mounting means 4. As will be seen in this drawing, the tape drawing roll 4a is screwed onto and upstanding from a shaft 29 which is mounted on the carriage 4c. The post-mounting plate 27 is formed therein with a hole or opening 30 through which the shaft 29 extends so that the plate 27 is pivotally movable together with the inclined post 4b about the axis of the shaft 29 within a limited range and can be fixed by a fastening screw 28 at a desired position relative to the carriage 4c.

Figure 9:
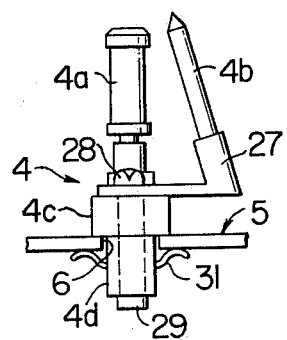
FIG. 9 is a front elevation of the tape drawing means shown in FIG. 7.
Figure 10:
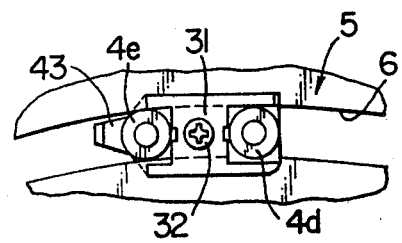
FIG. 10 is a bottom view of the tape drawing means.
Figure 11:
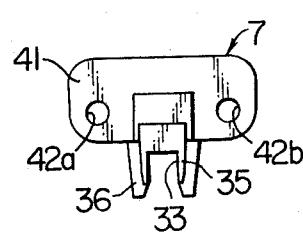
FIG. 11 illustrates in an enlarged top plan view one of stops shown in FIGS. 1 and 3.
Figure 12:
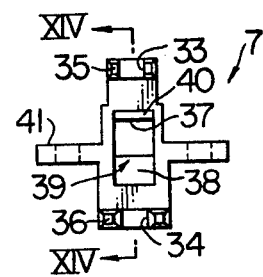
FIG. 12 is a front elevation of the stop shown in FIG. 11.
Figure 13:
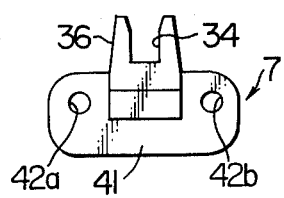
FIG. 13 is a bottom view of the stop shown in FIG. 11.

FIG. 9 is a front elevation of the tape drawing and mounting means 4 and illustrates the projection 4d as being engaged in the guide slot 6 formed in the guide board 5. FIG. 10 is a bottom view of the tape drawing and mounting means 4 and illustrates the projections 4d and 4e as being engaged in the guide slot 6. These projections 4d and 4e are laterally spaced. An H-shaped resilient retainer plate 31 is attached by a screw 32 to the bottom of the carriage 4c so that the central or cross bar of "H" shaped plate 31 extends between the two spaced projections 4d and 4e. The retainer plate 31 cooperates with the bottom surface of the carriage 4c to slidably pinch the guide board 5 therebetween. The projections 4d and 4e of the carriage 4c are both generally cylindrical and have diameters substantially equal to the width of the groove 6. Because the projections 4d and 4e are both cylindrical, these projections are smoothly movable along the guide groove 6 in despite of the guide groove 6 being arcuate or curved with a certain radius of curvature. In addition, the fact that the projections 4d and 4e are both cylindrical is also advantageous in that the carriages 4c and 4c' of the left and right tape guiding and mounting means 4 and 4' can be of a common shape and thus are suited for economical mass production.

The stops 7 and 7' are of the same shape and, thus, the structure of the stop 7 only will be discussed hereunder with reference to FIGS. 11 through 14. The stop 7 includes a pair of vertically spaced horizontal projections 35 and 36 which are so shaped as to define generally U-shaped notches 33 and 34, respectively. These projections 35 and 36 constitute first and second positioning means, respectively. A recess 39 is provided between the upper and lower projections 35 and 36 and has a horizontal upper surface 37 and an outwardly downwardly inclined lower surface 38. This recess constitutes a third positioning means. The outer edge of the horizontal upper surface 37 is bevelled to provide an outwardly and upwardly inclined surface 40 which is operative to facilitate an easy engagement of the carriage 4c of the tape drawing and mounting means 4 with the stop 7. The stop 7 is provided with a generally rectangular flange 41 the underside of which is designed for engagement with the upper surface of the guide board 5. The flange 41 is mounted on the guide board 5 by means of screws (not shown) which extend through screw holes 42a and 42b formed in the flange 41. The stop 7 is fabricated integral as a whole.

The carriage 4c of the tape drawing and mounting means 4 is provided with a rearward projection or nose 43 adapted to be engaged with the stop means on the stop 7, as will be seen in FIGS. 7, 8 and 10. The nose 43 has a substantially horizontal top surface 43a and a rounded lower corner edge 43b.

Figure 15:
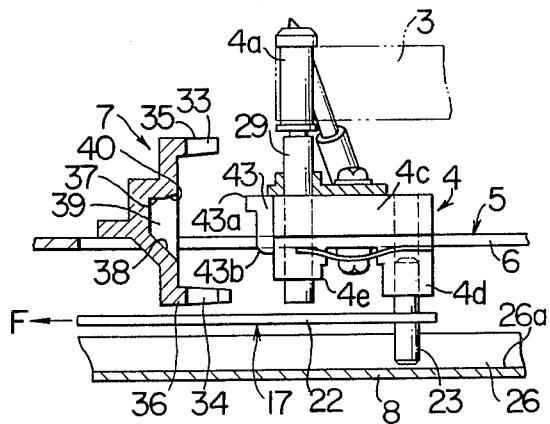
FIG. 15 is a fragmentary partly sectional side elevation of the apparatus of the invention showing one tape drawing means and an associated stop before they are engaged with each other.
Figure 14:
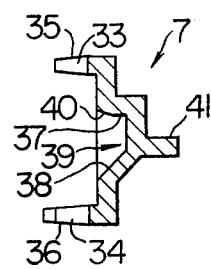
FIG. 14 is a sectional view of the stop as taken on line XIV—XIV in FIG. 12.
Figure 16:
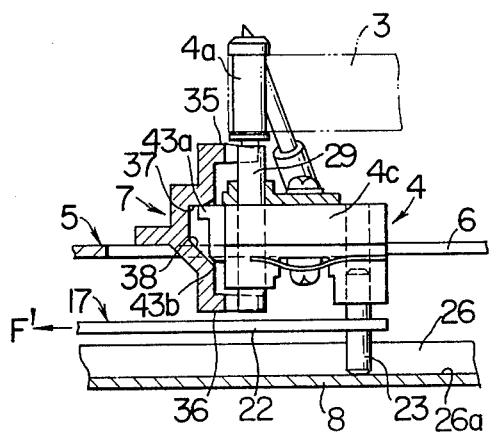
FIG. 16 is similar to FIG. 15 but illustrates the tape drawing means and the stop in their engaged positions.

The engagement between the nose 43 of the carriage 4c and the positioning means 39 on the stop 7 will be discussed in detail with reference to FIGS. 15 and 16, wherein FIG. 15 illustrates the tape drawing and mounting means 4 as being driven by a force F of the chain 17 and approaching to the stop 7 while drawing the tape 3 out of the cassette 2; and FIG. 16 illustrates the tape drawing and mounting means 4 when completely engaged with and properly positioned relative to the stop 7.

When the carriage 4c of the tape drawing and mounting means 4 approaches to the stop 7, the shaft 29 of the tape drawing roll 4a will first be engaged with and guided by the lower U-shaped notch 34 (second positioning means) formed in the stop 7. The shaft 29 will then be moved into engagement with the upper U-shaped notch 33 (first positioning means) in the stop 7 so that the shaft 29 is properly positioned in the lateral and vertical directions. Then, the top surface 43a of the nose 43 of the carriage 4c is guided by the upper inclined surface 40 of the recess 39 (third positioning means) and moved into engagement with the horizontal surface 37 of the recess. The rounded lower corner 43b of the nose 43 is moved into engagement with the lower inclined surface 38 of the recess 39. Accordingly, the tape drawing and mounting means 4 can be properly positioned in vertical and lateral directions as well as in the direction of movement thereof.

The structures of the carriage 4c of the tape drawing and mounting means 4 and of the stop 7 and the arrangement thereof, as discussed above, not only assure that the tape drawing and mounting means 4 when moved to the rearward end of its stroke is given a proper position in the vertical and lateral directions as well as in the direction of the stroke, but also prevent the shaft 29 of the tape drawing roll 4a of the carriage 4c (which shaft is one of the most important components of the apparatus) from being subjected to unduly strong external force which would otherwise cause a deformation of the shaft. This contributes to the maintenance of proper running of the tape in the apparatus.

As described, since the tape drawing and mounting means 4 and 4' of the apparatus of the present invention are driven by the cooperation of chains 17 and 17' and the driving means disposed rearwardly of the tape guiding drum 1 to wind and unwind the respective chains to move the tape drawing and mounting means, the magnetic tape 3 can surely be mounted around the tape guiding drum 1 of the rotary magnetic head assembly. In addition, the structure of the apparatus according to the present invention assures that the structure and arrangement of the components related to the tape mounting operation are greatly simplified and that the number of these components is minimized, with a resultant advantage that the apparatus of the invention can be manufactured at a greatly reduced cost.

What is claimed is:

1. An apparatus for recording and reproducing signals on and from a magnetic tape contained in a tape cassette mounted in a cassette receiving section thereof, the apparatus comprising:
    a base plate;
    a guide board disposed above said base plate;
    a rotary magnetic head assembly mounted on said base plate and including rotary magnetic heads for recording and reproducing signals on and from a magnetic tape mounted on said assembly;
    said cassette receiving section being located forwardly of said rotary magnetic head assembly;
    said guide board defining therein guide slots extending generally rearwardly from said cassette receiving section;
    a pair of tape drawing and mounting means operative to engage with a magnetic tape in a cassette mounted in said cassette receiving section, said tape drawing and mounting means being movable respectively along said guide slots to draw the tape out of said cassette to a position in which said tape is mounted on and extends around said rotary magnetic head assembly;
    means for stopping the movements of said tape drawing and mounting means at positions located substantially on the opposite sides of said rotary magnetic head assembly;
    chains disposed between said guide board and said base plate
    means for winding and unwinding said chains;
    each of said chains comprising a plurality of link members pivotally connected to each other by pins, each chain having respective ends connected to said chain winding and unwinding means and to said tape drawing and mounting means; and
    guide members mounted on said base plate and extending substantially rearwardly on the opposite sides of said rotary magnetic head assembly for guiding the pins of said chains.

2. A magnetic recording and reproducing apparatus as defined in claim 1, wherein said chain guide members are formed on said base plate by an outsert molding of a plastic material.

3. An apparatus for recording and reproducing signals on and from a magnetic tape contained in a tape cassette mounted in a cassette receiving section thereof, the apparatus comprising:
    a base plate;
    a guide board disposed above said base plate;
    a rotary magnetic head assembly mounted on said base plate and including rotary magnetic heads for recording and reproducing signals on and from a magnetic tape mounted on said assembly;
    said cassette receiving section being located forwardly of said rotary magnetic head assembly;
    said guide board defining therein guide slots extending generally rearwardly from said cassette receiving section;
    a pair of tape drawing and mounting means operative to engage with a magnetic tape in a cassette mounted in said cassette receiving section said tape drawing and mounting means being movable respectively along said guide slots to draw the tape out of said cassette to a position in which said tape is mounted and extends around said rotary magnetic head assembly;
    means for stopping the movements of said tape drawing and mounting means at positions located substantially on the opposite sides of said rotary magnetic head assembly;
    chains disposed between said guide board and said base plate and operatively connected to respective tape drawing and mounting means;
    means for winding and unwinding said chains comprising a worm disposed rearwardly of said rotary magnetic head assembly and extending forwardly substantially toward a central part of said assembly, and a pair of worm wheels disposed on the opposite sides of the axis of said worm and being in operative engagement therewith, one end of the respective chains being operatively connected to said worm wheels.

4. A magnetic recording and reproducing apparatus as defined in claim 3, wherein the connection between each of said chains and the associated worm wheel comprises an arcuate slot formed in the worm wheel, a first pin member engaged in said arcuate slot and mounted on said one end of said chain, a second pin member mounted on said worm wheel and a spring member extending between said first and second pin members to take up excessive drag which would otherwise be applied to tthe tape.

5. A magnetic recording and reproducing apparatus as defined in claim 4, wherein said wheels are formed from a plastic material.

6. An apparatus for recording and reproducing signals on and from a magnetic tape contained in a tape cassette mounted in a cassette receiving section thereof, the apparatus comprising:
   a base plate;
   a guide board disposed above said base plate;
   a rotary magnetic head assembly mounted on said base plate and including rotary magnetic heads for recording and reproducing signals on and from a magnetic tape mounted on said assembly;
   said cassette receiving section being located forwardly of said rotary magnetic head assembly;
   said guide board defining therein guide slots extending generally rearwardly from said cassette receiving section;
   a pair of tape drawing and mounting means operative to engage with a magnetic tape in a cassette mounted in said cassette receiving section, said tape drawing and mounting means being movable respectively along said guide slots to draw the tape out of said cassette to a position in which said tape is mounted on and extends around said rotary magnetic head assembly;
   means for stopping the movements of said tape drawing and mounting means at positions located substantially on the opposite sides of said rotary magnetic head assembly;
   chains disposed between said guide board and said base plate and operatively connected to respective tape drawing and mounting means;
   means for winding and unwinding said chains;
   guide members on said base plate for guiding the movements of said chains, respectively;
   each of said tape drawing and mounting means comprises a carriage movable on said guide board along one of said guide slots, a shaft mounted on said carriage and including first and second parts extending upwardly and downwardly from the upper and lower surfaces of said carriage, respectively, a tape drawing roll mounted on said first part of said shaft, and a nose extending from said carriage rearwardly toward an associated stop means; and
   wherein each of said stop means comprises a first positioning means operative to engage with said first part of said shaft and to guide the same to a laterally confined predetermined position; a second positioning means operative to engage with said second part of said shaft and to guide the same to a laterally confined predetermined position; and a third positioning means engageable with said nose to simultaneously position said carriage in a vertical direction and in a direction of movement thereof.

7. A magnetic recording and reproducing apparatus as defined in claim 6, wherein each of said chains comprises a plurality of link members pivotally connected each other and has ends respectively connected to said chain winding and unwinding means and to said tape drawing and mounting means.

8. A magnetic recording and reproducing apparatus as defined in claim 6, wherein said second positioning means extends forwardly nearer to the associated tape drawing and mounting means than said first positioning means so that said second positioning means is engaged with and guides said shaft before said first positioning means is engaged with and guides said shaft.

9. A magnetic recording and reproducing apparatus as defined in claim 7, wherein said third positioning means comprises a recess disposed between said first and second positioning means and having a horizontal surface and an inclined surface disposed in generally opposite relationship thereto, said horizontal and inclined surfaces being engageable with said nose of said carriage to simultaneously position said carriage in vertical direction and in the direction of movement thereof.

10. A magnetic recording and reproducing apparatus as defined in claim 6, wherein said first, second and third positioning means are formed integral with each other and mounted on said guide board.

11. A magnetic recording and reproducing apparatus as defined in one of claims 1 or 6, wherein said chain winding and unwinding means comprises a worm disposed rearwardly of said rotary magnetic head assembly and extending forwardly substantially toward a central part of said assembly, and a pair of worm wheels disposed on the opposite sides of the axis of said worm and being in engagement therewith, one end of the respective chains being operatively connected to said worm wheels.

12. A magnetic recording and reproducing apparatus according to claim 11, wherein the connection between each of said chains and the associated worm wheel comprises an arcuate slot formed in the worm wheel, a first pin member engaged in said arcuate slot and mounted on said one end of said chain, a second pin member mounted on said worm wheel and a spring member extending between said first and second pin members to take up excessive drag which would otherwise be applied to the tape.

13. A magnetic recording and reproducing apparatus according to claim 12, wherein said wheels are formed from a plastic material.

* * * * *